United States Patent [19] [11] Patent Number: 4,991,362
Heyer et al. [45] Date of Patent: Feb. 12, 1991

[54] HAND SCOURING PAD

[75] Inventors: Raymond F. Heyer, St. Paul; Connie L. Hubbard, Oakdale, both of Minn.

[73] Assignee: Minnesota Mining and Manufacturing Company, St. Paul, Minn.

[21] Appl. No.: 244,055

[22] Filed: Sep. 13, 1988

[51] Int. Cl.⁵ .............................................. B24D 11/00
[52] U.S. Cl. ........................................ 51/400; 51/402; 51/404; 51/295; 15/209 B; 15/226
[58] Field of Search ......................... 51/400, 402, 404; 15/209 B, 209 C, 226

[56] References Cited

U.S. PATENT DOCUMENTS

| | | | |
|---|---|---|---|
| 2,497,206 | 2/1950 | Bruce et al. | 15/209 C |
| 2,926,392 | 3/1960 | Jackson | 19/66 |
| 2,958,593 | 11/1960 | Hoover et al. | 51/295 |
| 3,260,582 | 7/1966 | Zimmer, Jr. et al. | 51/293 |
| 3,288,579 | 11/1966 | Coates et al. | 51/295 |
| 3,382,058 | 5/1968 | Wise et al. | 51/295 |
| 3,860,565 | 1/1975 | Barber, Jr. | 260/77.5 |
| 4,040,139 | 8/1977 | Botvin | 15/209 B |
| 4,126,428 | 11/1978 | Rude | 51/295 |
| 4,133,070 | 1/1979 | Litt | 51/392 |
| 4,227,350 | 10/1980 | Fitzer | 51/295 |
| 4,355,489 | 10/1982 | Heyer et al. | 51/400 |
| 4,486,200 | 12/1984 | Heyer et al. | 51/295 |

FOREIGN PATENT DOCUMENTS 1398244 4/1973 United Kingdom .

Primary Examiner—Frederick R. Schmidt
Assistant Examiner—M. Rachuba
Attorney, Agent, or Firm—Donald M. Sell; Walter N. Kirn; Andrew D. Sorensen

[57] ABSTRACT

A low-density nonwoven abrasive pad, especially suited for use as a scouring article, formed of a multiplicity of continuous, crimped thermoplastic organic filaments having one end of substantially all of the filaments bonded together at one end of the pad and the opposite end of substantially all of the filaments bonded together at the opposite end of the pad. The abrasive pad is made by arranging the filaments into an open lofty array, bonding substantially all of the filaments together at a first and second bond site, and then cutting the array at the bond sites such that each bond is divided into at least two bond area segments with each bond area segment having the filament array bonded therein in a unitary structure.

5 Claims, 1 Drawing Sheet

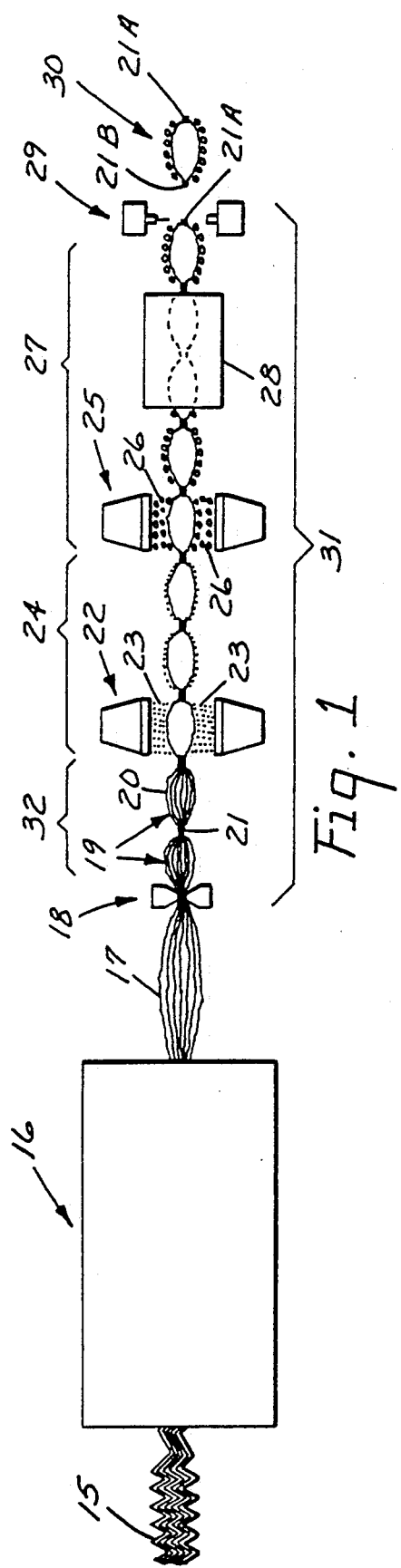
Fig. 1
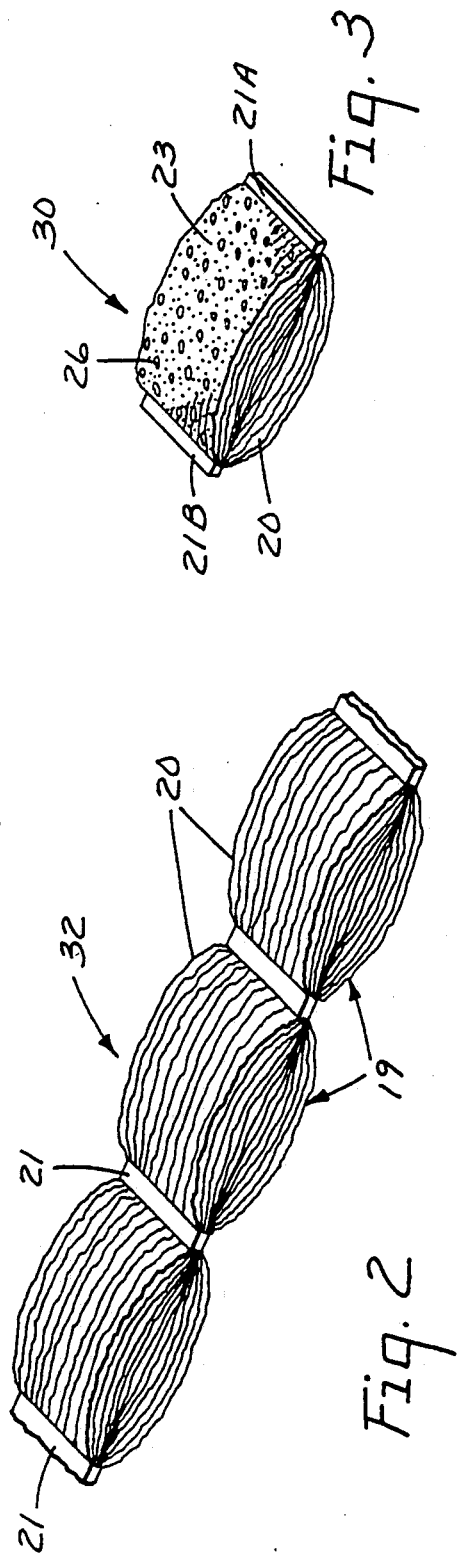

HAND SCOURING PAD

TECHNICAL FIELD

This invention relates to a novel low-density scouring pad and a method of making the same.

BACKGROUND OF THE ART

The use of lofty, fibrous, nonwoven abrasive products for scouring surfaces such as the soiled surfaces of pots and pans is well known. These products are typically lofty, nonwoven, open mats formed of fibers which are bonded together at points where they intersect and contact each other.

Low-density abrasive products of this type can be formed of randomly disposed staple fibers which are bonded together at points of contact with a binder that contains abrasive particles. The staple fibers typically have been crimped and are laid down by equipment such as a "Rando Webber" web-forming machine (marketed by the Curlator Corporation of Rochester, N.Y. and described in U.S. Pat. Nos. 2,541,915; 2,700,188; 2,703,441 and 2,744,294) to form a lofty open mat. One very successful commercial embodiment of such an abrasive product is that sold under the trade designation "Scotch-Brite" by the 3M Company of St. Paul, Minn. Low-density abrasive products of this type can be prepared by the method disclosed by Hoover et al. in U.S. Pat. No. 2,958,593.

While such abrasive products have had excellent commercial success, their production requires a considerable investment in equipment. A "Rando Webber" web-forming machine, for example, can cost in the thousands of dollars. Additionally, the fibers used to form the web of such abrasive products typically require chopping to produce staple fibers which is both costly and time consuming.

The low density abrasive products described above may also be formed of webs or mats of continuous fibers. For example, in U.S. Pat. No. 4,227,350, Fitzer discloses a low-density abrasive product comprising a uniform cross-section, generally flat-surfaced, open, porous, lofty web of autogenously bonded, continuous, undulated, interengaged filaments. The web of Fitzer is formed by downwardly extruding a plurality of thermoplastic organic filaments into a quench bath. As the filaments enter the quench bath, they begin to coil and undulate, thereby setting up a degree of resistance to the flow of the molten filaments, causing the molten filaments to oscillate just above the bath surface. The spacing of the extrusion openings from which the filaments are formed is such that, as the molten filaments coil and undulate at the bath surface, adjacent filaments touch one another. The coiling and undulating filaments are still sufficiently tacky as this occurs, and, where the filaments touch, most adhere to one another to cause autogenous bonding to produce a lofty, open, porous, handleable filament web. The web, so formed, is then impregnated with a tough binder resin which adherently bonds the filaments of the web together and also bonds a multitude of abrasive granules, uniformly dispersed throughout the web, to the surface of the filaments.

Additionally, fibrous polishing and/or abrading materials can be prepared from continuous or substantially continuous synthetic filaments by the method disclosed by Zimmer et al. in U.S. Pat. No. 3,260,582. In this method crimped or curled continuous filaments are straightened out under tension into a substantially parallel relationship with one another, uniformly coated while under tension, with an adhesive which may or may not contain abrasive particles, interlocked one with another by release of such tension and then set in a permanently interlocked and lofty, open, three-dimensional state by curing or setting up the adhesive.

SUMMARY OF THE INVENTION

The present invention provides a low-density, lofty, open, porous, nonwoven pad which is easily and economically manufactured, and which can be used in any of a variety of applications, most preferably as a kitchen scouring pad. The pad comprises a multiplicity of crimped or undulated, continuous, thermoplastic organic filaments that are bonded together (e.g., by fusion or an adhesive) at opposite ends. Each filament having both a first end and a second end with substantially all of the first ends bonded together in a first bond area and substantially all of the second ends bonded together in a second bond area. The pad is generally sufficiently coarse to be useful as a scouring pad per se, however, it may also have abrasive particles adherently bonded to the filaments to provide additional abrasiveness.

The pad of the invention is made by arranging a multiplicity of continuous, crimped or undulated, thermoplastic organic filaments in an open lofty array with one point of each filament in the array corresponding to a first filament bonding site and a second point of each filament, distant from the first point, corresponding to a second filament bonding site. A pad is formed in the filament array by bonding substantially all of the thermoplastic organic filaments together at the first and second bonding sites. This provides, respectively, a first and second bond area, each comprising bonded filaments, with a nonbonded portion of the filament array in between. The bond areas are of sufficient size to permit division thereof into at least two bond area segments per bond area, with each bond area segment having the filament array bonded therein in a unitary structure. An individual pad is provided by dividing each of the first and second bond areas, respectively, into at least two bond area segments, each having the filament array bonded therein in a unitary structure, by cutting the filament array within the bond areas. Furthermore, when a pad having greater abrasiveness is desired, abrasive particles may be adherently bonded to the filaments of the pad, preferably before the individual pad is cut from the filament array.

BRIEF DESCRIPTION OF THE DRAWING

The features of the present invention can best be understood and appreciated by reference to the accompanying drawing, wherein:

FIG. 1 is a schematic illustration of a process and apparatus useful in making the abrasive pads of the invention from tow.

FIG. 2 is a perspective view of a section of an open lofty filament array having substantially all of the thermoplastic organic filaments bonded together at substantially regular intervals along its length.

FIG. 3 is a perspective view of an individual pad made in accordance with the present invention.

DETAILED DESCRIPTION OF THE INVENTION

The open lofty filament array useful in the present invention may be formed by assembling individual crimped or undulated filaments, or by spreading apart (opening) tow. Tow is a commercially available, crimped, rope-like bundle of continuous, extruded organic filaments. Tow typically is a highly compacted product in which adjacent filaments contact each other over a large percentage of their lengths and, therefore, requires opening to form an open lofty array. Tow may be opened by conventional methods such as stretching the tow under tension in its lengthwise direction and then releasing the tension and allowing the tow to relax, as disclosed in U.S. Pat. No. 2,926,392, Jackson, incorporated herein by reference.

Filaments useful in the present invention are preferably extruded from an organic thermoplastic polymeric material. Preferably, the thermoplastic material has a break strength of at least one gram per denier to provide the necessary degree of toughness for prolonged use as a scouring article. Useful filament-forming polymeric materials include polyamides such as polycaprolactam and polyhexamethylene adipamide (e.g., nylon 6 and nylon 6,6), polyolefins (e.g., polypropylene and polyethylene), polyesters (e.g., polyethylene terephthalate), and the like. Useful filaments can range in size from about 6 denier to about 400 denier, although filaments ranging from 6 to 200 denier are preferred. When commercially available tow is the source of these filaments, the tow should be crimped by conventional methods such as a stuffer box, a gear crimper or the like.

As shown in FIG. 1, tow 15 is opened in tow opening station 16 to form an open lofty filament array 17. Thereafter, pads 19 composed of continuous, crimped or undulated filaments 20 are formed in the open lofty filament array 17 by bonding, in bonding station 18, substantially all of the filaments together in bond areas 21 spaced at substantially regular intervals along the length of the array. These bond areas typically are perpendicular to the lengthwise direction of the array and span the entire width of the array, thereby forming a segmented array of rectangular pads 32 as shown in FIG. 2. The bond areas must be of sufficient size to permit division thereof into at least two bond area segments with each bond area segment having the filament array bonded therein in a unitary structure. Generally, elongate bond areas ranging from about 2 mm to 5 mm in width are preferred.

The bond areas may be formed by adhering the filaments together with a suitable adhesive composition or by fusing the thermoplastic filaments together with heat (heat-sealing). The preferred method of bonding the filaments together is by heat-sealing with an ultrasonic heat-sealing press such as a Bronson Sonic Sealer available from Bronson Sonic Power Co. of Danbury, Conn.

As shown in FIGS. 1 and 3, individual pads 30 comprising a multiplicity of continuous, crimped or undulated, thermoplastic organic filaments 20, each filament having both a first and a second end, with substantially all of the first ends bonded together in a first bond area 21A and substantially all of the second ends bonded together in a second bond area 21B are formed by cutting the segmented filament array 31, in cutting station 29, such that each of said bond areas 21 are divided into at least two bond area segments 21A and 21B, respectively, each bond area segment having the filament array bonded therein in a unitary structure. The bond area segments located at opposite ends of the pad provide sufficient structural integrity to the pads that the pads can be used for scouring soiled surfaces without requiring that the filaments be bonded together at points of contact within the open lofty portion of the pad, as is common in conventional scouring pads.

If a more abrasive scouring pad is desired, abrasive particles may be adherently bonded to the surface of the filaments. As shown in FIG. 1, the abrasive granules 26 will typically be bonded to the segmented filament array 32 before individual pads 30 are cut therefrom. However, this is not required and abrasive granules may be bonded to the individual pads after they are cut from the array, if desired.

Typically, as shown in FIG. 1, the segmented filament array 32 will first be spray coated, in spray coating station 22, with a thermosetting liquid adhesive binder material 23 which will cure, under conditions which will not damage the filament array, to a tough adherent material. Examples of suitable thermosetting liquid adhesives include aqueous emulsions and solvent solutions of epoxy, melamine, phenolic, isocyanate and isocyanurate resins, and varnish. Conventional web coating techniques such as dip coating, roll coating, and spray coating may be used to coat the filament array with the liquid adhesive binder. However, spray coating is preferred as it provides more control over the amount of adhesive binder being applied to the filament array than dip coating, and has less impact on the loftiness of the filament array than roll coating. Thereafter, the wet adhesive coated filament array 24 is passed through abrasive granule coating station 25 and is coated with abrasive particles 26. Conventional abrasive granule coating techniques, such as drop coating, electrostatic coating, and spray methods similar to those used in sandblasting, except with milder conditions, may be used to coat the wet adhesive coated filament array with abrasive particles. Alternatively, a slurry of abrasive granules in a liquid binder adhesive may be applied to the segmented filament array in a single coating application by conventional means. Spray coating is again preferred for the reasons discussed above. Thereafter, the wet adhesive and abrasive granule coated filament array 27 is typically passed through a forced air oven 28 to cure or set the binder resin and bond the abrasive particles to the filaments, before being cut into individual pads 30.

Abrasive materials useful in the pads of the invention may be a soft abrasive, a hard abrasive or a mixture thereof. Soft abrasives, having a Mohs hardness in the range of about 1 to 7, provide the pad with a mildly abrasive surface. Examples of soft abrasives include such inorganic materials as garnet, flint, silica, pumice and calcium carbonate; and such organic polymeric materials as polyester, polyvinylchloride, methacrylate, methylmethacrylate, polycarbonate, and polystyrene. Hard abrasives, those having a Mohs hardness greater than about 8, provide the pad with an aggressive abrasive surface. Examples of hard abrasives include such materials as silicon carbide, aluminum oxide, topaz, fused alumina-zirconia, boron nitride, tungsten carbide, and silicon nitride.

The particle size of the abrasive particles can range from about 80 grade (average diameter of about 200 micrometers) to about 280 grade (average diameter of about 45 micrometers) or finer. However, when used in a kitchen scouring pad, the preferred average particle size of the soft abrasive should be on the order of about 160 micrometers, or finer, to provide a mildly abrasive surface to the pad capable of cleaning plastic (i.e., "Teflon") coated pan surfaces, plastic dishes, etc., without harmful scratching. Similarly, when used in a kitchen scouring pad, the preferred average particle size of the hard abrasive should be on the order of about 45 micrometers or finer, to provide an aggressive abrasive surface capable of scouring pots and pans that are soiled with baked-on or burned cooking residues without harmful scratching.

The pad of the invention may take any of a variety of shapes and sizes. For example, the pad may be circular, elliptical, or quadrangular. However, the preferred pad is rectangular and is of a size and bulk to be easily grasped in the hand of the user. Preferably, the pad is from about 5 to 15 cm in length, from about 5 to 10 cm in width, and from about 1 to 5 cm in thickness.

The most preferred embodiment of the present invention comprises a rectangular pad with a length of approximately 7 cm, a width of approximately 4 cm, and a thickness of approximately 3 cm, having 280 grade, or finer, aluminum oxide abrasive particles adhered to the crimped or undulated continuous filaments by an isocyanurate or phenolic resin binder. However, it is within the scope of the invention to include other ingredients in the pad such as pigments, fillers, or other additives. It may be desired, for example, to impregnate the pad with a cleansing composition such as that disclosed in U.S. Pat. No. 3,788,999 or U.S. Pat. No. 4,189,395.

The invention is further illustrated by the following nonlimiting examples wherein all parts are by weight unless otherwise specified.

EXAMPLE I

Fiber in tow form, comprising continuous 50 denier stuffer box crimped polyester fibers, with 2520 filaments in the tow bundle, was opened by stretching and relaxing it in a conventional manner. The array of opened tow fibers was then ultrasonically sealed at intervals of approximately seven centimeters along its length by a Bronson Sonic Sealer available from Bronson Sonic Power Co. of Danbury, Conn., to form a segmented strip of pads as shown in FIG. 2. The seal width between pads was 0.32 centimeters, and the width of each pad was approximately 4.45 centimeters. Cutting the segmented strip approximately at the midline of each seal resulted in a three-dimensional pad with a loft depth of approximately 2.85 centimeters and a distal end thickness that was approximately 1.0 millimeter in depth.

EXAMPLE II

An isocyanurate forming resin binder was prepared by blending the following components:

67.98 grams of a polymethylene polyphenyl isocyanate terminated resin commercially available from the Mobay Corporation of Pittsburgh, Pa., under the trade designation Mondur MRS;

25.02 grams of a polypropyleneglycol (CAS 25322-69-4) commercially available from the Union Carbide Corporation of Danbury, Conn., under the trade designation NIAX PPG-1025;

0.0465 grams stannous octoate commercially available from Air Products and Chemicals, Inc., of Allentown, Pa., and 7.00 grams of encapsulated potassium lactate prepared as described in U.S. Pat. No. 4,126,428 or U.S. Pat. No. 3,860,565.

Pads were formed, as in Example I, and then spray coated with the resin binder described above, which forms an isocyanurate resin binder upon curing, to a dry coating weight of approximately 0.65 grams per pad. The resin coated pad was then sprayed with grade 280 and finer aluminum oxide abrasive particles (commercially available from the Norton Co. of Worcester, Mass.) to a coating weight (abrasive only) of approximately 2.27–2.92 grams per pad before the resin was cured. The abrasive mineral was sprayed from a "Speedaire" sand blast gun commercially available from the Dayton Electric Manufacturing Co. of Chicago, Ill.

EXAMPLE III

Pads were formed from the continuous tow fibers, as described in Example I, and then spray coated with the phenolic resin slurry described below to a dry coating weight of approximately 2.92 grams of resin and abrasive per pad. The phenolic slurry coating was then cured in an oven at 330° F.

| Phenolic Resin Slurry | Parts by Weight |
| --- | --- |
| Water | 9.10 |
| Isopropanol | 2.30 |
| A-stage base catalyzed phenol-formaldehyde resin (70% solids) | 17.33 |
| Pigment dispersion | 6.60 |
| Calcium carbonate | 4.00 |
| 280 grade and finer aluminum oxide particles | 60.67 |

EXAMPLE IV

Scouring pads, formed as described in Example II, were roll coated with approximately 10.0 grams of the soap solution described below, and the coating was dried in an oven at 125° F.

| Soap Solution Ingredients | Parts by Weight |
| --- | --- |
| Coconut monoethanolamide | 4.5 |
| Sodium lauryl ether sulfate (70% solids) | 7.5 |
| Sodium dodecylbenzene sulfonate | 13.0 |
| Tallow soap base | 8.0 |
| Sodium carbonate | 17.0 |
| Sodium xylene sulfonate solution (40%) | 2.0 |
| Water | 48.0 |

TEST METHODS

The scouring pads formed in the examples described above were then tested to determine their effectiveness in removing burned-on food from a stainless steel panel. A measured amount of a standard food soil composition was coated onto stainless steel panels and baked at 232° C. for thirty minutes. The panels were alternately coated and baked three times in this manner.

A coated panel was then placed into a slotted tray in a tank of water and a scouring pad to be tested was secured in a standard weighted holder in a Heavy Duty Gardner Wear Tester (commercially available from Gardner Laboratory, Inc. of Bethesda, Md.) and passed back and forth over the surface of the coated panel to complete one cycle. When the scouring pads to be tested did not have a cleansing composition associated therewith, dishwashing detergent (commercially available from the Proctor and Gamble Company of Cincinnati, Ohio, under the trade designation Ivory) was added to the tank of water in an amount of 2 ml of detergent per 250 ml of water. The number of cycles needed to remove 50% and 90% of the food soil was then determined and recorded.

For purposes of comparison two commonly used kitchen scouring articles were also tested according to this method. The results of these tests are reproduced in Table I.

TABLE I

|  | Cycles to 50% Clean | Cycles to 90% Clean |
| --- | --- | --- |
| Example I | >1000 | >1000 |
| Example II | 54.0 | 70.2 |
| Example III | 129 | 160 |
| Example IV | 27.8 | 38.9 |
| SOS (steel wool) | 65.9 | 89.2 |
| 3M Aqua "Scotch-Brite" Scouring Pad | 66.6 | 91.2 |

The lower number of cycles represents a more efficient scouring pad. This data indicates that the scouring pads of examples II, and IV are more effective in removing burned-on food than conventional kitchen scouring materials.

What is claimed is:

1. A method of making a scouring article, comprising the steps of:
    (a) arranging a multiplicity of continuous, crimped or undulated, thermoplastic, organic filaments into an open lofty array with one point of each filament in said array corresponding to a first filament bonding site and a second point of each filament, distant from said first point, corresponding to a second filament bonding site;
    (b) bonding substantially all of said thermoplastic organic filaments together at said first and said second bonding sites to respectively provide a first bond area comprising bonded filaments and a second bond area comprising bonded filaments, said bond areas being of a size sufficient to permit division thereof into at least two bond area segments per bond area with each bond area segment having said filament array bonded therein in a unitary structure; and
    (c) dividing each of said first and said second bond areas into at least two bond area segments, each bond area segment having said filament array bonded therein in a unitary structure, by cutting said filament array within said bond areas to provide an open, lofty, nonwoven pad.
2. The method of claim 1 wherein said step of arranging organic filaments into an open lofty array comprises opening a substantially continuous length of crimped tow.
3. The method of claim 1 wherein said step of bonding substantially all of said thermoplastic organic filaments together comprises melt-fusing said filaments together with heat.
4. The method of claim 3 wherein said melt-fusing is by ultrasonic sound waves.
5. The method of claim 1 further comprising the additional steps of:
    (d) coating said array of thermoplastic filaments, at least between said bond areas, with a liquid, curable thermosetting adhesive binder material;
    (e) depositing a multitude of abrasive particles throughout the adhesive binder coated thermoplastic filament array; and
    (f) curing said liquid, curable adhesive binder material to bond said abrasive particles to said array of thermoplastic filaments.

* * * * *